Dec. 31, 1963  M. P. YESS  3,115,913
MULTIPURPOSE TOOL WITH CLUTCH LATCH
Filed Dec. 1, 1961  2 Sheets-Sheet 1
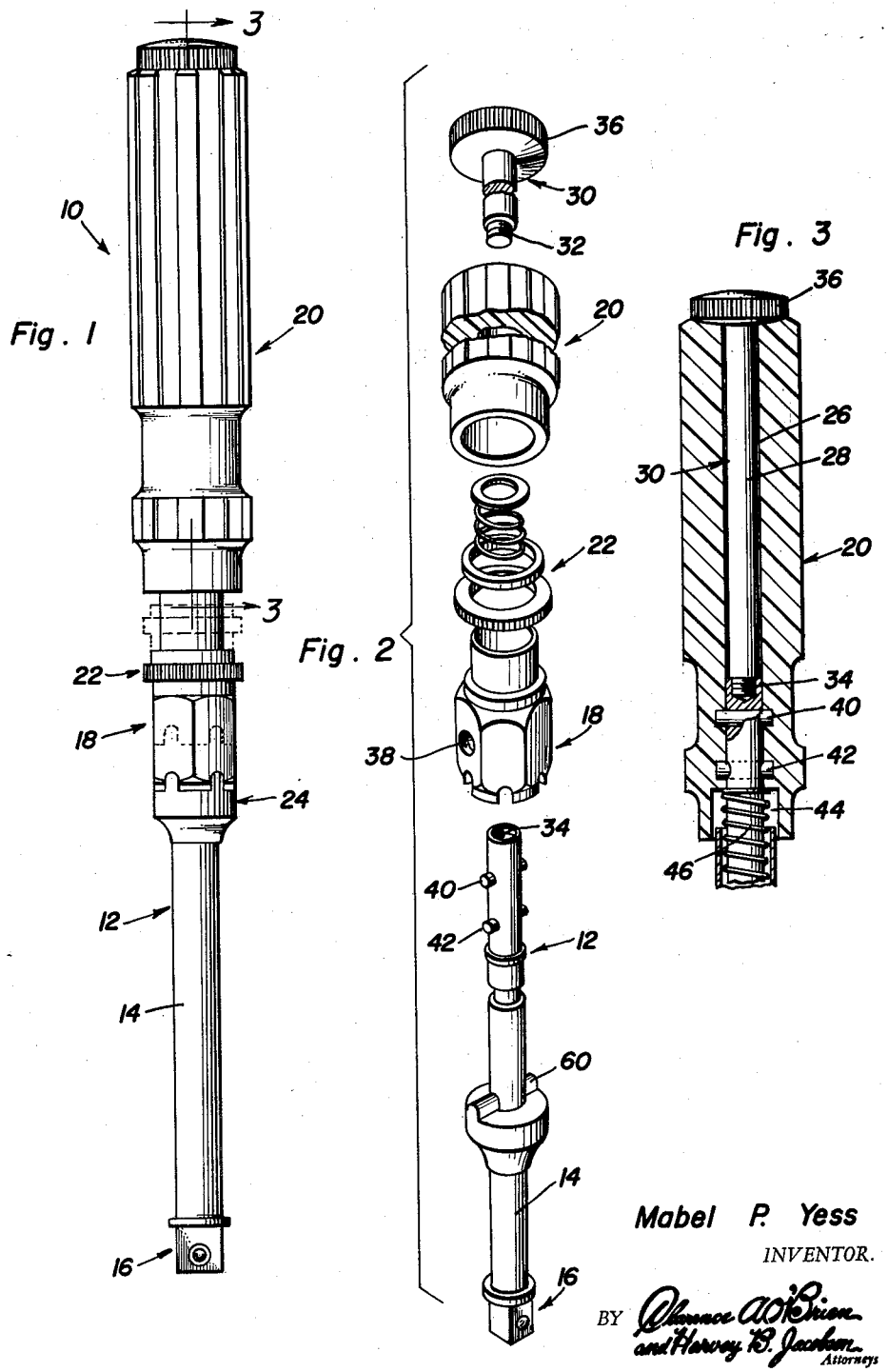
Mabel P. Yess
INVENTOR.

Dec. 31, 1963   M. P. YESS   3,115,913
MULTIPURPOSE TOOL WITH CLUTCH LATCH
Filed Dec. 1, 1961   2 Sheets-Sheet 2

Mabel P. Yess
INVENTOR.

BY Clarence A. O'Brien
and Harvey B. Jacobson
Attorneys

L # United States Patent Office 3,115,913
Patented Dec. 31, 1963

3,115,913
MULTIPURPOSE TOOL WITH CLUTCH LATCH
Mabel P. Yess, Schenectady, N.Y.
(111 E. Central St., Worcester 5, Mass.)
Filed Dec. 1, 1961, Ser. No. 156,237
14 Claims. (Cl. 145—61)

This invention relates to a rotary torque control device particularly useful for a multipurpose tool and constitutes an improvement over tool devices such as disclosed in Patent No. 2,641,291 for a Ratchet Clutch Handle, issued June 9, 1953.

It will become apparent therefore, that the present invention is concerned with clutch controlled tool devices for applying torque to screwdrivers, wrenches or the like either in both directions by direct application of torque manually to a grip handle or through a sleeve in a clutch position, or to unclutch the sleeve in one direction of rotation for the return stroke. In utilizing the clutch control sleeve for applying torque to the driven member of the tool device, a considerable advantage was obtained because of the increased leverage and also because of the facilities provided for declutching the sleeve on the return stroke. The same device or a similar device may be rendered even more useful should the clutch control sleeve be selectively held in an inoperative position wherein the clutch is disengaged so that the driven member of the tool device may be free of the clutch control sleeve to facilitate direct rotation thereof when desired without undesirable rotational movement being imparted to the clutch control sleeve as for example when having a lever arm attached thereto or a tool engaged therewith.

It is therefore a primary object of the present invention to provide a tool device of the type hereinbefore mentioned in which the clutch control sleeve may be selectively held in an unclutched or inoperative position by a unique and simple structural arrangement of parts without disturbing the operative utility of the tool.

Another object of this invention is to provide a novel locking mechanism automatically rendered inoperative when the clutch control sleeve with which it is associated is in an operative position, said locking mechanism being rendered operative when the clutch control sleeve is in its declutched position for selective actuation in order to hold the clutch control sleeve in the inoperative position.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a longitudinal elevational view of the tool device of the present invention;

FIGURE 2 is a perspective disassembled view of the tool device;

FIGURE 3 is a partial longitudinal sectional view of the tool device taken substantially through a plane indicated by section line 3—3 in FIGURE 1;

Figure 4:
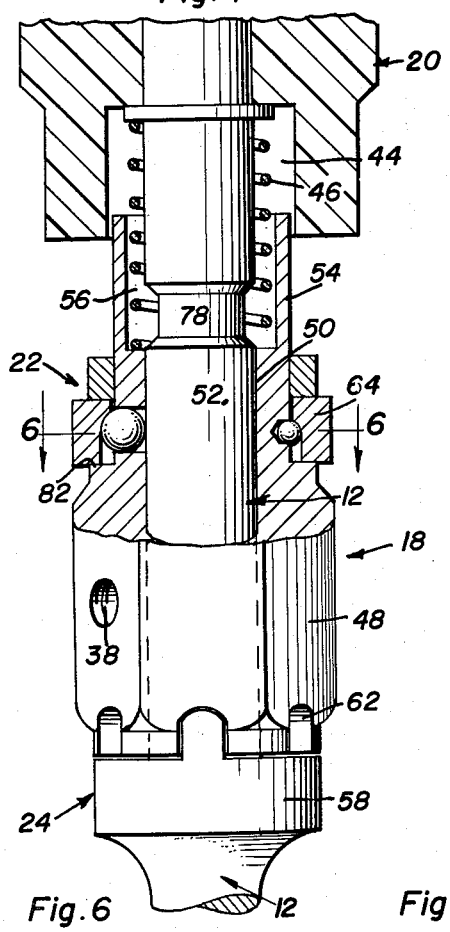
FIGURE 4 is an enlarged partial sectional view of the tool device illustrated in its clutched condition.

Referring now to the drawings in detail, it will be observed from FIGURES 1 and 2, that the tool device of the present invention is generally referred to by reference numeral 10 and includes a driven member generally referred to by reference numeral 12 having a lower shank portion 14 to which any suitable tool 16 may be secured requiring the application thereto of rotational torque. Rotatably and slidably mounted on the driven member 12 is a clutch control sleeve assembly generally referred to by reference numeral 18. Fixedly secured to the driven member 12 at its upper end portion, is a grip handle generally referred to by reference numeral 20. A selectively operable lock mechanism generally referred to by reference numeral 22 is also provided and is rotationally mounted on the clutch sleeve assembly 18. As illustrated in FIGURE 1, the clutch control sleeve assembly 18 is disposed in clutched position and hence is rotationally locked to the driven member 12 by means of the clutch mechanism generally referred to by reference numeral 24. Torque may accordingly be applied to the driven member 12 either by the application of torque to the grip handle 20 or to the control sleeve assembly 18. Application of torque to the control sleeve assembly 18 may be achieved by either applying a tool to the external surface of the assembly 18 or securing thereto of a lever arm.

Referring therefore to FIGURES 2 and 3 in particular, it will be observed that the grip handle 20 which may be made of any suitable material and design, is provided with a centrally disposed bore 26 within which there is received the shank portion 28 of a lever arm 30. The lever arm 30 is therefore provided at one end of an externally threaded portion 32 that may be threadedly received within an internally threaded socket 34 at the upper end of the driven member 12 when the lever arm 30 is not in use. As seen from FIGURE 3, the lever arm member 30 also is provided with a finger grip portion 36 which rests upon the upper end of the handle grip member 20. When in use, the lever arm member 30 may be removed from the handle grip member 20 and the threaded end 32 thereof threadedly received within a threaded aperture 38 formed in the control sleeve assembly 18 for the purpose of securing the lever arm member 30 thereto in order to enable the application of torque to the sleeve assembly 18 in one direction and also enable it to be readily displaced from the clutched condition for ratcheting purposes by disengagement in the opposite direction during return stroke movement. The handle grip member 20 on the other hand is permanently connected to the driven member 12 and hence is secured to the upper end portion of the driven member 12 by means of a pair of anchor pins 40 and 42 as more clearly seen in FIGURE 3. The lower end of the handle grip member 20 is also provided with a socket chamber 44 telescopically receiving a portion of the control sleeve assembly 18 and also forming a reaction seat for a control sleeve biasing spring 46.

Referring now to FIGURE 4 in particular, it will be observed that the control sleeve assembly 18 includes a torque applying portion 48 which is of hexagonal cross section or any suitable polygonal configuration so as to enable the application of a tool thereto in order to apply torque. The sleeve assembly is also provided with a centrically disposed bore 50 so as to rotationally receive therethrough the portion 52 of the driven member 12. The sleeve assembly 18 is also provided with a cylindrical control portion 54 including a spring-receiving recess 56 telescopically received within the socket portion 44 of the grip handle 20 when the sleeve assembly 18 is displaced upwardly against the bias of the spring 46 as more clearly seen in FIGURE 5. The control portion 54 of the sleeve assembly also mounts thereon the locking mechanism 22. In this manner, the spring 46 is protectively enclosed at all times so as to prevent damage thereto because of exposure as well as to provide a housing for the spring capable of retaining lubricant therein.

Figure 5:
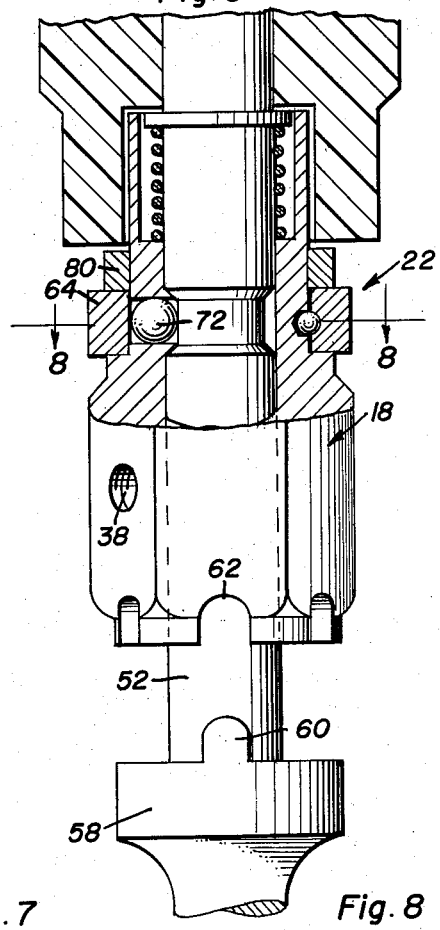
FIGURE 5 is an enlarged sectional view similar to that of FIGURE 4 illustrating the clutch device locked in its declutched condition.

In the position illustrated in FIGURE 4, the sleeve assembly 18 is clutched to the driven member 12 by means of the clutch mechanism 24 which includes a shouldered lug portion 58 mounting a pair of lugs 60 which are adapted to be received with a plurality of circumferentially spaced clutch notches 62 formed at the lower end of the sleeve assembly 18. It will therefore be appreciated, that when the lever arm member 30 is secured to the sleeve assembly 18 rotational torque may be applied thereto and transmitted to the driven member through the clutch mechanism 24 in one direction and then may be displaced upwardly disengaging said clutch against the bias of the spring 46 for the return stroke of the sleeve assembly under the manual control of the user. FIGURE 5 accordingly illustrates the sleeve assembly 18 in its declutched position with the sleeve assembly in its upward limit position. However, the sleeve assembly 18 as illustrated in FIGURE 5 is held locked in the upper limit position so as to rotationally free the driven member 12 from the sleeve as hereinbefore indicated. The lock mechanism 22 is therefore provided for this purpose.

Figure 6:
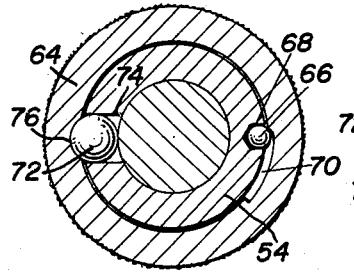
FIGURE 6 is a transverse sectional view taken through a plane indicated by section line 6—6 in FIGURE 4.
Figure 7:
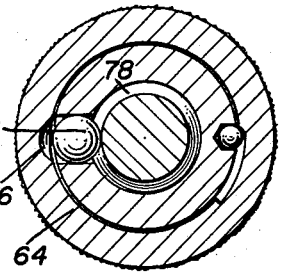
FIGURE 7 is a sectional view similar to FIGURE 6 illustrating the tool device in its declutched condition.
Figure 8:
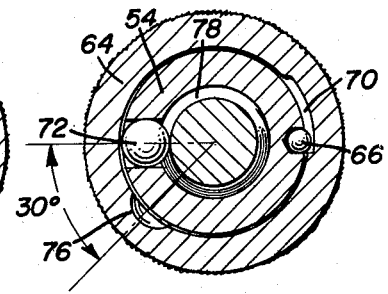
FIGURE 8 is a sectional view similar to that of FIGURE 7 illustrating the tool device locked in its declutched condition and taken through a plane indicated by section line 8—8 in FIGURE 5.

The lock mechanism 22 includes a latch ring member 64 which is rotationally mounted on the control sleeve portion 54 of the sleeve assembly 18. The latch ring member 64 is however limited in angular movement with respect to the sleeve assembly because of an angular limit device which includes a projecting ball element 66 seated within a recess 68 in the sleeve portion 54. The element 66 projects into an arcuate recess 70 of constant depth as seen in FIGURES 6–8 formed internally within the latch ring element 64 so as to thereby limit rotational movement of the latch ring with respect to the sleeve portion 54 between the positions respectively illustrated in FIGURES 6 and 8. However, when the sleeve assembly 18 is in its clutched position, as illustrated in FIGURE 6, the latch ring 64 is rotationally locked to the sleeve assembly by means of a radially displaceable ball locking element 72 which is displaceably mounted within an aperture 74 in the sleeve portion 54, said locking ball element 72 then being received within a separate axially extending groove 76 internally formed within the latch ring 64 and circumferentially spaced from the arcuate recess 70. The latch ring 64 is thereby locked in one angular limit position with respect to the sleeve assembly. When however the sleeve assembly is slidably displaced to its declutched position against the bias of the spring 46, the locking ball element 72 will then be aligned with an annular groove or ball race 78 formed within the portion 52 of the driven member so as to enable release of the locking ball element 72 from the groove 76 in the latch ring. The latch ring 64 will then be free and may easily be displaced from its position illustrated in FIGURE 7 by 30 degrees to the position as illustrated in FIGURE 8 so that the groove 76 is no longer aligned with the locking ball element 72, angular displacement being limited by the non-binding coaction between the projecting ball element 66 and the arcuate recess 70. The sleeve assembly 18 will then be locked to the driven member 12 against relative slidable movement so as to hold the control sleeve assembly in the declutched position as illustrated in FIGURE 5.

From the foregoing description, the operation and utility of the tool device and in particular the selectively operable lock mechanism for holding the tool device in its declutched condition, will be apparent. The total device may accordingly be operated in a manner similar to a ratcheting wrench or screwdriver through use of the lever arm member 30. When it is desired however to free the driven member 12 from the control sleeve assembly so that the driven member may be manually rotated for any desired purpose, the user may upwardly displace the control sleeve assembly to the position illustrated in FIGURE 5 and with a mere flick of the thumb rotationally displace the latch ring 64 being externally provided with a thumb-gripping surface or knurling as shown for such purpose so as to thereby lock the control sleeve assembly in its declutched position. Rotational displacement of the latch ring 64 in the opposite direction will then release the control sleeve assembly for movement to its clutch position under the influence of the biasing spring 46. The use of separate recesses 70 and 76 in the latch ring 64 thus conditions the latch ring for free floating between limit positions when the sleeve 18 is in the upper position so that said flick of the thumb is sufficient to latch the sleeve in its upper position. Also, the use of springs is avoided in connection with latch operation. Inasmuch as the latch ring 64 is rotatably mounted on the control sleeve portion 54, it is maintained assembled thereon by means of a lock element 80 fixed to the sleeve portion 54 by a force fit so as to maintain the lock ring 64 in axial position between the lock element 80 and the shoulder 82 between the portions 48 and 54 of the sleeve assembly. The locking mechanism 22 is thereby operatively mounted on the portion 54 of the sleeve assembly which is also operative to enclose the annular recess on the driven member portion 52 for all positions of the sleeve assembly and in cooperation with the socket portion 44 of the handle 20, completely enclose the spring 46 which constantly biases the sleeve assembly to the clutch position as hereinbefore indicated. It will also be appreciated that the locking mechanism 22 will be inoperative in the clutch position of the sleeve assembly while in the declutched condition it will then be operative to permit selective angular displacement thereof by a limited amount in order to lock the sleeve assembly against axial movement relative to the driven member.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A torque thrust control device for rotary tools or the like comprising, a driven member adapted to have tools secured thereto, grip means axially secured to said driven member for direct manual application of torque thereto, clutch control sleeve means slidably mounted on said driven member for movement between two limit positions thereon, biasing means enclosed by the grip means and the sleeve means constantly biasing said sleeve means to one of said limit positions, clutch means operatively connected to said sleeve means and driven member and engageable to transmit torque from the sleeve means to the driven member in both rotational directions when said sleeve means is at said one limit position, torque applying means operatively connectible to said sleeve means for applying torque thereto in one direction and slidably moving said sleeve means to the other limit position for return stroke release of said clutch means and selectively operable lock means axially fixed in exposed relation on the sleeve means and responsive to limited displacement thereof to engage said driven member for positively holding said sleeve means in said other limit position.

2. The combination of claim 1, wherein said sleeve means comprises a torque applying portion of polygonal cross section, and a control portion operatively mounting said selectively operable lock means and enclosing said biasing means, said control portion being telescopingly received within said grip means when the sleeve means is slidably moved toward said other limit position.

3. The combination of claim 2, wherein said selectively operable lock means comprises a latch ring rotatably mounted on said sleeve means having an externally exposed grip surface, angular limit means engageable with the sleeve means to limit angular displacement of the latch ring relative to the sleeve means between an operative and in operative position only in the other limit position of the sleeve means, and separate radially displaceable locking means operative to rotationally lock the latch ring to the sleeve means when in the one limit position while permitting slidable movement thereof and responsive to positioning of the sleeve means in the other limit position to permit rotational displacement of the latch ring to thereby lock the sleeve means against slidable movement on the driven member.

4. The combination of claim 3, wherein said radially displaceable means comprises, a lock element displaceably mounted within an aperture in the sleeve means for projection into an internal axial groove formed in the latch ring in circumferentially spaced relation to said angular limit means to rotationally lock the latch ring to the sleeve means, said lock element being releasable from said axial groove when aligned with an annular recess in the driven member in the other limit position of the sleeve means to permit angular displacement of the latch ring and the axial groove from alignment with the lock element to lock the sleeve means against slidable movement.

5. The combination of claim 4, wherein said angular limit means comprises a projecting element mounted in the sleeve means and received within an internal arcuate recess formed within the latch ring.

6. The combination of claim 1, wherein said selectively operable lock means comprises a latch ring rotatably mounted on said sleeve means having an externally exposed grip surface, angular limit means engageable with the sleeve means to limit angular displacement of the latch ring relative to the sleeve means between an operative and inoperative position only in the other limit position of the sleeve means, and separate radially displaceable locking means operative to rotationally lock the latch ring to the sleeve means when in the one limit position while permitting slidable movement thereof and responsive to positioning of the sleeve means in the other limit position to permit rotational displacement of the latch ring to thereby lock the sleeve means against slidable movement on the driven member.

7. The combination of claim 6, wherein said radially displaceable means comprises, a lock element displaceably mounted within an aperture in the sleeve means for projection into an internal axial groove formed in the latch ring in circumferentially spaced relation to said angular limit means to rotationally lock the latch ring to the sleeve means, said lock element being releasable from said axial groove when aligned with an annular recess in the driven member in the other limit position of the sleeve means to permit angular displacement of the latch ring and the axial groove from alignment with the lock element to lock the sleeve means against slidable movement.

8. The combination of claim 1, wherein said selectively operable lock means includes a latch ring having an internal arcuate recess, and a projecting element mounted in the sleeve means and received within said internal arcuate recess for free movement within predetermined angular limits.

9. The combination of claim 8, wherein said selectively operable lock means further includes separate radially displaceable locking means axially fixed to the sleeve means in spaced relation to said projecting element for respectively engaging the latch ring in said one limit position and said driven member in the other limit position to respectively lock the latch ring against angular displacement and the sleeve means against slidable movement on the driven member.

10. A latch mechanism for a control sleeve comprising a shaft slidably and rotationally mounting said control sleeve, selectively displaceable means axially fixed in exposed relation on the control sleeve, displacement limit means mounted on the control sleeve and engageable with the displaceable means for guiding free movement of said displaceable means relative to the control sleeve within predetermined limits, and positive lock means movably mounted on the control sleeve in spaced relation to the displacement limit means and responsive to positioning of the displaceable means at said predetermined limits to alternatively lock the displaceable means against movement on the control sleeve and lock the control sleeve against slidable movement on the shaft, in accordance with different axial positions of the control sleeve on the shaft.

11. A latch mechanism for a control sleeve slidably and rotationally mounted on a shaft comprising, selectively displaceable means axially fixed in exposed relation on the control sleeve, displacement limit means mounted on the control sleeve and engageable with the displaceable means for guiding free movement of said displaceable means relative to the control sleeve within predetermined limits, and positive lock means movably mounted on the control sleeve in spaced relation to the displacement limit means and responsive to positioning of the displaceable means at said predetermined limits to alternatively lock the displaceable means against movement on the control sleeve and lock the control sleeve against slidable movement on the shaft, in accordance with different axial positions of the control sleeve on the shaft, and means for biasing said control sleeve to one of said axial positions wherein the lock means is operative to lock the displaceable means against movement on the control sleeve.

12. The combination of claim 10, wherein said lock means comprises, a radially displaceable member mounted in the control sleeve for projection outwardly and inwardly therefrom, said member being projected radially inwardly by engagement with said displaceable means for reception within an annular groove formed in the shaft at one of said axial positions, said member being projected radially outwardly by the shaft at other axial positions for reception within a groove formed within the displaceable means in spaced relation to the limit means.

13. The combination of claim 12 wherein said limit means includes, an outwardly projecting element mounted in the control sleeve in spaced relation to the lock means, and an arcuate recess formed in the displaceable means in spaced relation to said groove to receive said element for free guided movement between positions wherein said groove is radially aligned and non-aligned with the radially displaceable member.

14. The combination of claim 10 wherein said limit means includes, an outwardly projecting element mounted in the control sleeve in spaced relation to the lock means, and an arcuate recess formed in the displaceable means in spaced relation to said lock means for free guided movement between positions wherein the lock means is rendered operative and inoperative to lock the control sleeve to the shaft or to the displaceable means.

References Cited in the file of this patent

UNITED STATES PATENTS

| | | |
|---|---|---|
| 2,518,139 | Hallowell et al. | Aug. 8, 1950 |
| 2,621,688 | Wales | Dec. 16, 1952 |
| 2,641,291 | Yess | June 9, 1953 |
| 2,664,126 | Mansfield et al. | Dec. 29, 1953 |